United States Patent
Lantz

(10) Patent No.: US 10,758,839 B1
(45) Date of Patent: Sep. 1, 2020

(54) SEPARATION OF DISTILLATION PRODUCTS USING COLOR SENSING

(71) Applicant: Illuminated Extractors Ltd., Fort Collins, CO (US)

(72) Inventor: Zachary Richard Lantz, Fort Collins, CO (US)

(73) Assignee: Illuminated Extractors, Ltd., Fort Collins, CO (US)

(*) Notice: Subject to any disclaimer, the term of this patent is extended or adjusted under 35 U.S.C. 154(b) by 0 days.

(21) Appl. No.: 16/254,196

(22) Filed: Jan. 22, 2019

Related U.S. Application Data

(60) Provisional application No. 62/619,931, filed on Jan. 22, 2018.

(51) Int. Cl.
*B01D 3/42* (2006.01)
*B01D 3/16* (2006.01)
*G01J 3/46* (2006.01)
*B01D 5/00* (2006.01)

(52) U.S. Cl.
CPC .............. *B01D 3/166* (2013.01); *B01D 3/42* (2013.01); *B01D 5/006* (2013.01); *G01J 3/46* (2013.01)

(58) Field of Classification Search
CPC .......... B01D 3/166; B01D 3/42; B01D 5/006; G01J 3/46
See application file for complete search history.

(56) References Cited

U.S. PATENT DOCUMENTS

| 3,177,899 | A  | * | 4/1965  | Anderson  | F16K 11/072 137/625.29 |
| 4,528,635 | A  | * | 7/1985  | Juodikis  | B01D 3/42 374/27 |
| 4,604,363 | A  | * | 8/1986  | Newhouse  | B01D 1/0082 159/47.1 |
| 5,405,585 | A  | * | 4/1995  | Coassin   | B01J 19/0046 137/625.19 |
| 9,604,153 | B1 | * | 3/2017  | Quinlan   | B01D 3/40 |
| 10,363,495 | B2 | * | 7/2019 | Urvantsau | B01D 3/4233 |
| 2007/0017291 | A1 | * | 1/2007 | Cypes    | B01D 3/00 73/590 |
| 2010/0031743 | A1 | * | 2/2010 | Scheiner | G01F 23/292 73/290 V |
| 2012/0059303 | A1 | * | 3/2012 | Barrett  | A61B 5/14557 604/5.01 |
| 2017/0003264 | A1 | * | 1/2017 | Adams    | G01N 33/2823 |
| 2018/0043279 | A1 | * | 2/2018 | Quinlan  | B01D 3/40 |
| 2018/0306708 | A1 | * | 10/2018 | Metting | C11B 1/00 |

* cited by examiner

*Primary Examiner* — Jonathan Miller
(74) *Attorney, Agent, or Firm* — Samuel M. Freund; Cochran Freund & Young LLC

(57) ABSTRACT

The use transmission/absorbance of visible light to determine accurate separation of distillation products emerging from a condenser is described. Changes in wavelength and intensity of light transmitted through or absorbed by the distillate, post condenser, determine when a new fraction passes through the condenser, and may be directed to an appropriate collection vessel.

8 Claims, 4 Drawing Sheets

SEPARATION OF DISTILLATION PRODUCTS USING COLOR SENSING

CROSS-REFERENCE TO RELATED APPLICATIONS

The present application claims the benefit of U.S. Provisional Patent Application No. 62/619,931 for "DISTILLATION PROCESS DATA LOGGER & TRAINING AID" which was filed on Jan. 22, 2018, the entire content of which is hereby specifically incorporated by reference herein for all that it discloses and teaches.

BACKGROUND

Distillation involves heating a liquid to create vapor, which is collected when condensed at a separate location from the original liquid, based on the different boiling points or volatilities of the components of the liquid. To effectively accomplish multicomponent separation using distillation, it is necessary to accurately identify the various factions as they are condensed.

Presently, determination of fraction points of a distillation includes measurement of the system temperature and pressure, knowledge of the boiling points of the desired products, and observing changes in color of the receiver. Typically, higher boiling point products exhibit darker color than lower boiling point products; therefore, the color of the received products darkens as the distillation temperature increases. However, the varying rates of products moving through the system may result in multiple fractions having different boiling points being grouped together, making the exact points of separation difficult to determine.

Additionally, if the boiling points of the desired products are close, these products will boil and condense at the same time, requiring additional distillations to achieve the required purity. Therefore, it is necessary to carefully control the distillation system throughout the separation process.

SUMMARY

In accordance with the purposes of embodiments of the present invention, as embodied and broadly described herein, the present invention includes the use of a color sensor to determine accurate separation of distillation products emerging from the condenser, along with temperature and pressure sensors for monitoring internal conditions within the system.

Benefits and advantages of embodiments of the present invention include, but are not limited to, providing a distillation system having a color sensor for detecting changes in wavelength and intensity of light transmitted through or absorbed by the distillate, post condenser, for determining when a new fraction passes through the condenser.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of an embodiment of the distillation apparatus of the present invention, illustrating a sight tube following the distillate condenser, while

DETAILED DESCRIPTION

Briefly, embodiments of the present invention include a distillation apparatus comprising a boiling flask, a flask heater, a short-path distillation head, a distillate condenser, a sight port or a sight tube having a light source and a color sensor the output of which is directed to a computer, following the condenser for viewing the distillate in real time, and a fraction collector. The sight port is transparent to visible light such that absorption by the distillate may be detected. The apparatus may be made from glass or metal, depending on the materials to be fractionated, and the distillation process may be carried out under reduced pressure. When the pressure is lowered, the boiling points of the compounds contained within the boiling flask, making it faster and more efficient to distill heavier molecules.

As stated, the color sensor detects changes in intensity and wavelength transmitted through or absorbed by the condensed distillate for determining the arrival of a new fraction from the condenser, which can then be separated from the distillate by a rotary receiver or deflection-type fraction collector, as examples.

Short-path distillation is a distillation technique that involves the distillate travelling a short distance, often only a few centimeters, and is normally done at reduced pressure. A classic example would be a distillation involving the distillate travelling from one glass bulb to another, without the need for a condenser separating the two chambers. It is a continuous process with very short residence time. where the distillate only has to travel a short distance before condensing, and ensuring that little compound is lost on the sides of the apparatus. Although a short-path distillation head has been used for some of the experiments, it is not required.

Figure 1A:
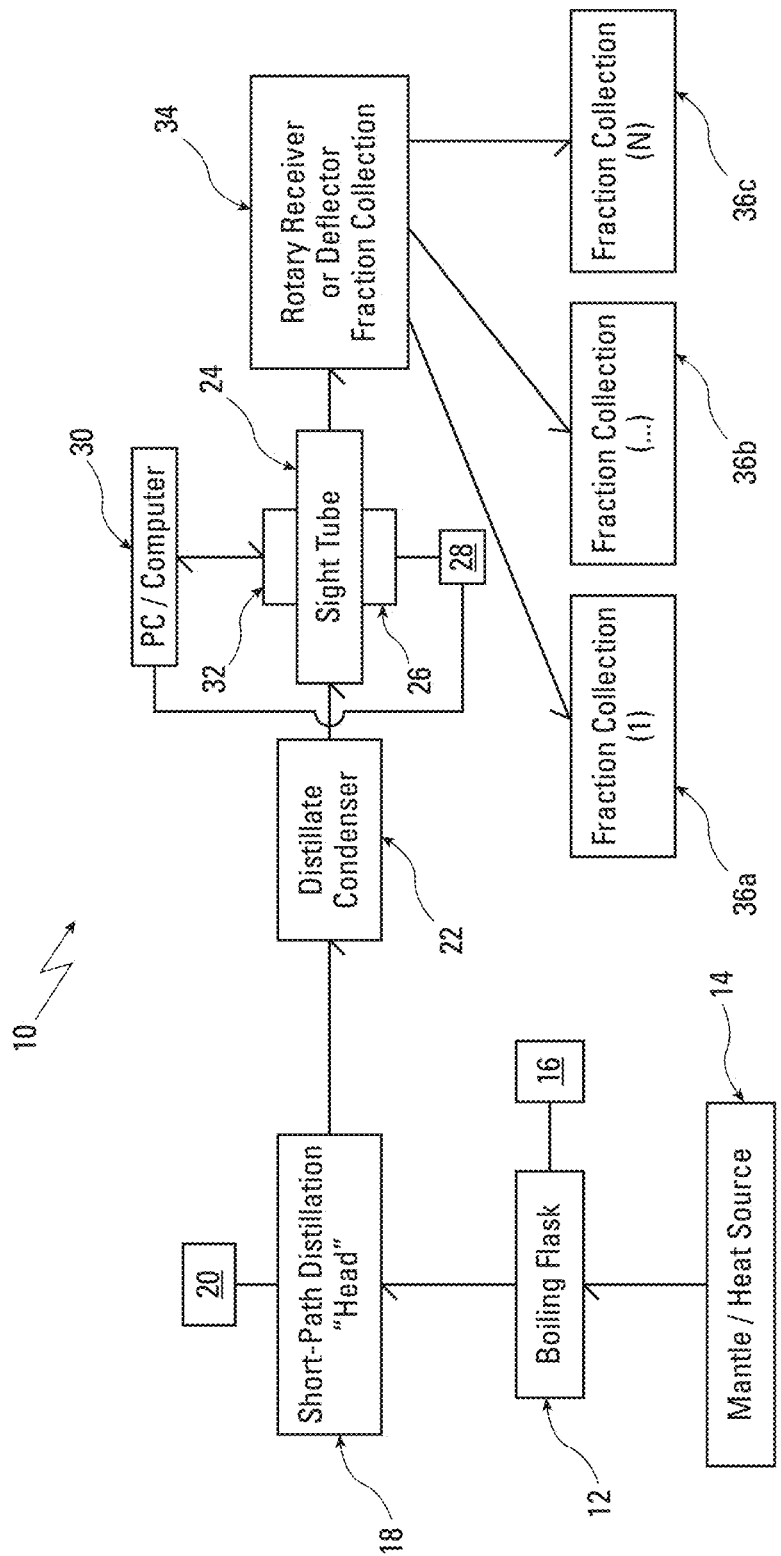

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 1A, a schematic representation of an embodiment of apparatus, 10, of the present invention is illustrated. Shown are distillation flask, 12, supported and electrically heated by mantle, 14, having its temperature monitored by first temperature sensor, 16. Mantle 14 may also provide stirring features to distillation flask 12. Clearly, other heat sources may be used depending on the particular materials to be distilled. Short-path distillation head, 18, having second temperature sensor, 20, directs the distillate into condenser, 22, which may be water cooled (not shown in FIG. 1). Pressure sensors may be employed if the distillation is performed under vacuum.

Sight port, 24, may be part of distillate condenser 22, or may be a separate tubular structure as will be described in more detail below. Transmissive light source, 26, powered by power source, 28, and controlled by computer, 30, may be a white or multi-colored (red, green, and blue, as examples) visible light emitting diode (LED), or an incandescent lamp, as two examples, is placed directly opposite light detector, 32, on the surface of hollow, transparent sight tube 24 through which distillate passes after being condensed. The output from light detector 32 is directed into PC 30 for storage and analysis. Light source 26 may be continuous or pulsed. Light detector 32 may be a dye chip having areas for detecting red, green, and blue light as well as areas for detecting white light, the latter being effective for monitoring light intensity from light source 26.

Based on the transmittance/absorbance information provided by light source 26, light detector 32 and computer 30, the distillate is directed into rotary receiver, typically, a cow, pig or, or mon-style receiver, or a deflector fraction collection system, 34, which collects appropriate fractions in vessels, 36a-36c.

Figure 1B:
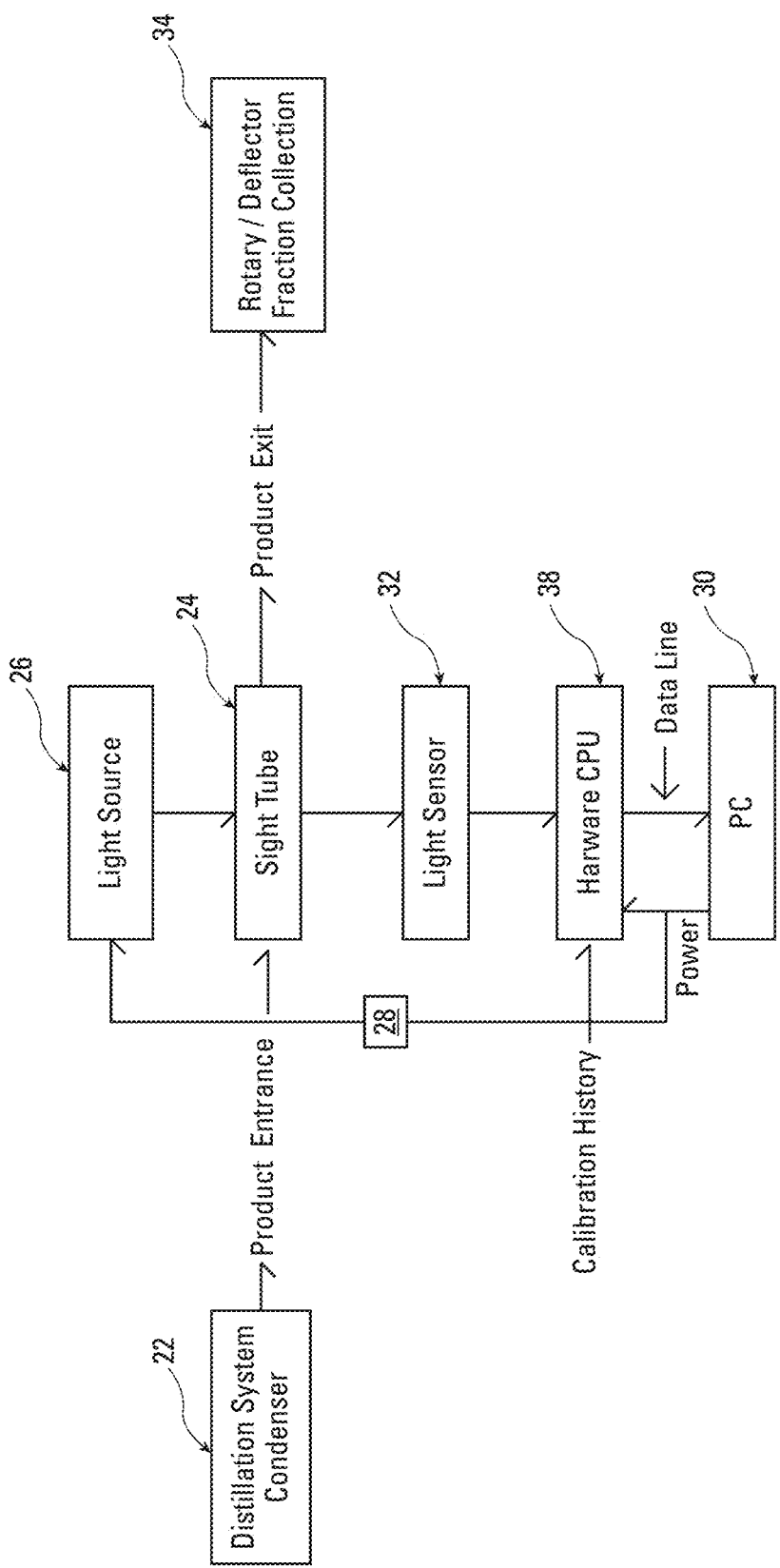
FIG. 1B is a schematic representation of a portion of the apparatus shown in FIG. 1A hereof, illustrating a CPU onto which calibration history of material being distilled is loaded.

FIG. 1B is a schematic representation of a portion of the apparatus shown in FIG. 1A hereof, illustrating hardware CPU onto which calibration history of material being distilled is loaded, whereby the fraction signatures received by color sensor 32 are used to direct the fraction collection.

Figure 2A:
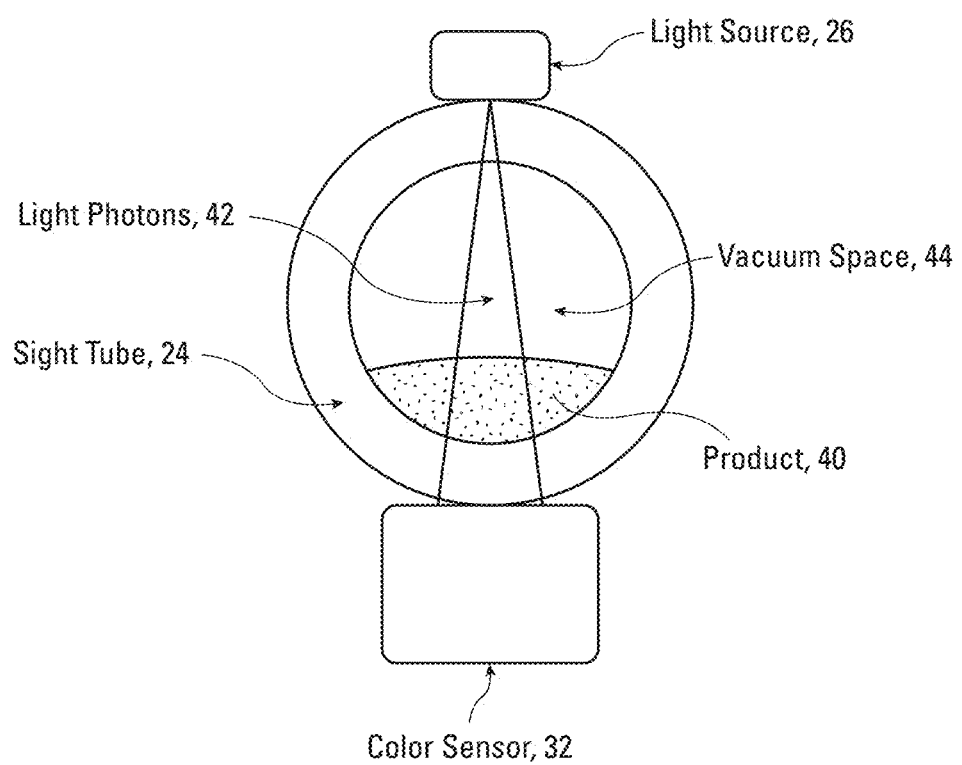
FIG. 2A is a schematic representation of a cross section view of an embodiment of the visible light transparent, hollow sight tube through which distillate is flowing, showing a light source and light detector on opposite sides of the exterior thereof, and showing visible photons passing through the sight tube and through the distillate, before entering light detector.

FIG. 2A is a schematic representation of a cross section view of hollow, transparent sight tube 24, showing light source 26 and color sensor 32 on opposite sides of the exterior of transparent sight tube 24 through which distillate, 40, is shown flowing, and photons, 42, are shown passing through sight tube 24 and through distillate 40, before entering color sensor 32. Vacuum space, 44, is identified in the event that the distillation is undertaken at reduced pressures.

Figure 2B:
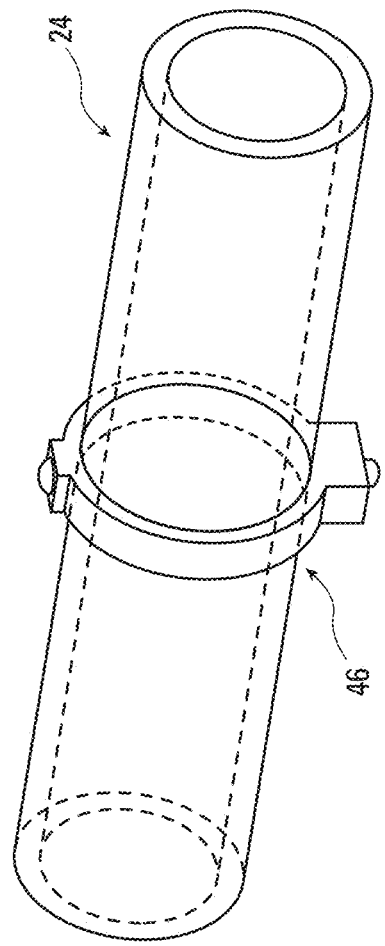
FIG. 2B is a schematic representation of a tapered embodiment of the sight tube, further illustrating a ring for supporting light source and light detector on the outer surface thereof, for ease of disassembly and cleaning.
Figure 2C:
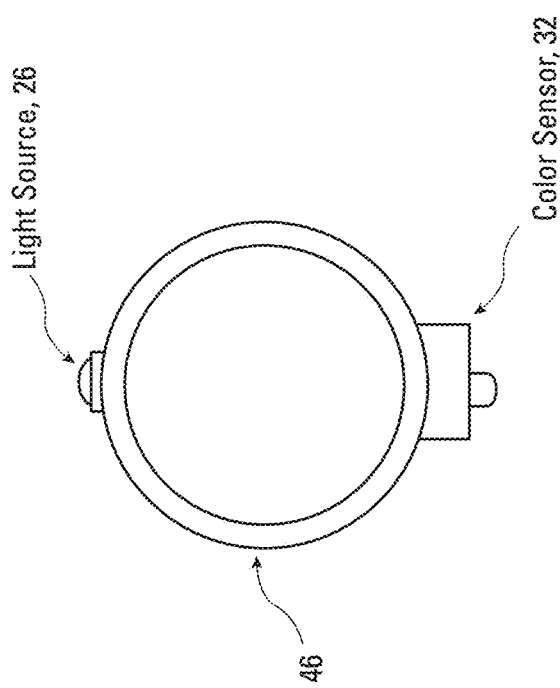
FIG. 2C is a schematic representation of a front view of the ring.

FIG. 2B is a schematic representation of a tapered embodiment of sight tube 24, illustrating ring, 46, for supporting light source 26 and color sensor 32 on the outer surface thereof, for ease of disassembly and cleaning tube 24. FIG. 2C is a schematic representation of a front view of ring 46.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for separating distillation fractions, comprising:
    a distillation apparatus comprising:
        a distillation flask;
        a source of heat for said distillation flask;
        a distillate condenser having a fluid input and a fluid output;
        a distillation head for providing fluid communication between said distillation flask and the fluid input of said distillate condenser;
        a hollow sight tube through which distillate flows, having a fluid input in fluid communication with the fluid output of said distillate condenser for receiving fluid from said distillate condenser, a fluid output, and a wall having a visible light transparent portion for permitting visible light to pass through said fluid from the fluid output of said distillate condenser through the wall; and
        at least two receiving flasks for receiving distillate from the fluid output of said sight tube; and
    a source of visible light for directing light through the visible light transparent portion of the wall of said sight tube; and
    a visible light detector for receiving visible light having passed through the visible light transparent portion of the wall of said sight tube and through said fluid from the fluid output of said distillate condenser, and for generating an electrical signal in response thereto;
    whereby changes in the electrical signal are indicative of changes in the distillate fraction.

2. The apparatus of claim 1, wherein said distillate condenser is water cooled.

3. The apparatus of claim 1, further comprising a rotary receiver or deflection-type fraction collector, for directing distillate fractions to one of said at least two receiving flasks.

4. The apparatus of claim 1, wherein said distillation apparatus comprises a vacuum distillation apparatus.

5. The apparatus of claim 1, wherein said distillation head is a short-path distillation head.

6. A method for separating distillation fractions, comprising:
    passing distillate from a distillation apparatus through a hollow sight tube having a wall with a visible light transparent portion for permitting visible light to pass through said distillate through the wall;
    directing visible light through the visible light transparent portion of the wall;
    receiving visible light having passed through the visible light transparent portion of the wall of the sight tube and through said fluid, and generating an electrical signal in response thereto;
    whereby changes in the electrical signal are indicative of changes in the distillate fractions; and
    separating the distillate fractions into at least two fractions in response to changes in the electrical signal.

7. The method of claim 6, further comprising the step of directing distillate to a collection vessel in response to changes in the electrical signal.

8. The method of claim 6, wherein the distillation apparatus comprises a vacuum distillation apparatus.

* * * * *